(12) United States Patent
Kurtz et al.

(10) Patent No.: US 6,766,021 B2
(45) Date of Patent: Jul. 20, 2004

(54) ECHO CANCELLER

(75) Inventors: Scott David Kurtz, Mt. Laurel, NJ (US); Brian Michael McCarthy, Sr., Lafayette Hill, PA (US)

(73) Assignee: Adaptive Digital Technologies, Conshoken, PA (US)

( * ) Notice: Subject to any disclaimer, the term of this patent is extended or adjusted under 35 U.S.C. 154(b) by 573 days.

(21) Appl. No.: 09/805,351

(22) Filed: Mar. 13, 2001

(65) Prior Publication Data

US 2003/0016815 A1 Jan. 23, 2003

(51) Int. Cl.[7] .......................... H04M 1/00; H04M 9/00; H04M 9/08
(52) U.S. Cl. ............... 379/406.08; 379/406.01; 379/406.02; 379/406.06; 379/406.09; 375/285; 375/296; 708/322
(58) Field of Search ................ 379/406.01–406.16; 375/285, 296; 708/322

(56) References Cited

U.S. PATENT DOCUMENTS

| | | | | |
|---|---|---|---|---|
| 5,475,632 A | * | 12/1995 | Sugiyama | 708/819 |
| 5,689,556 A | * | 11/1997 | Gupta et al. | 379/406.06 |
| 6,246,760 B1 | * | 6/2001 | Makino et al. | 379/406.08 |
| 6,347,141 B1 | * | 2/2002 | Klein et al. | 379/406.08 |
| 6,516,063 B1 | * | 2/2003 | Farrell et al. | 379/406.08 |
| 6,549,587 B1 | * | 4/2003 | Li | 375/326 |

* cited by examiner

*Primary Examiner*—Curtis Kuntz
*Assistant Examiner*—Alexander Jamal
(74) *Attorney, Agent, or Firm*—Howard R. Popper

(57) ABSTRACT

A method of echo cancellation for a signal transmission system in which the size of the step used to adapt filter coefficients is adjusted in accordance with the echo delay and in which stationary signals are avoided by determining when the mean and variance of coefficients obtained from a second order linear predictive coding analysis of successive far end samples exceed preset thresholds.

11 Claims, 2 Drawing Sheets

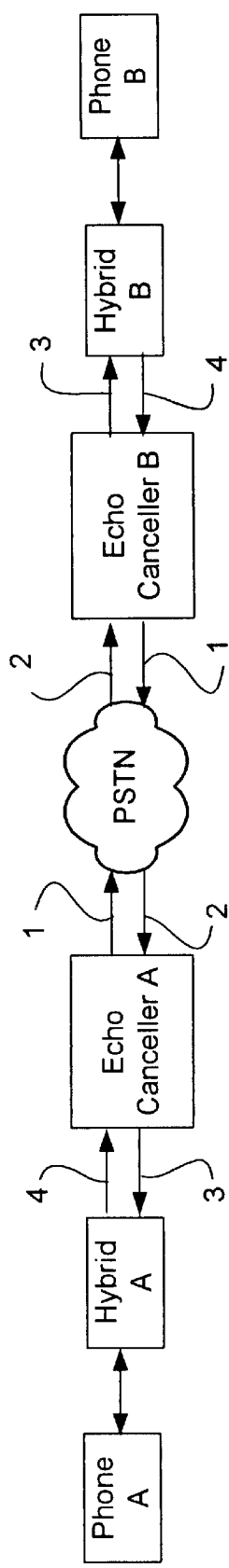
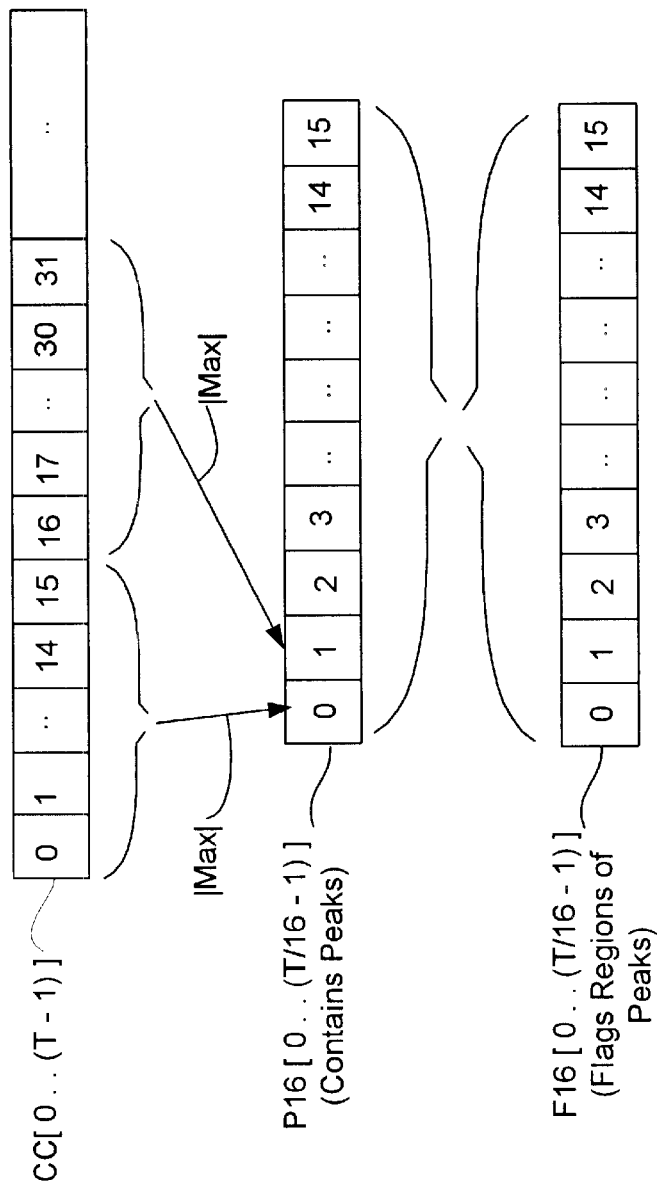

ECHO CANCELLER

FIELD OF THE INVENTION

This invention relates to echo cancellers used in the public switched telephone network (PSTN).

BACKGROUND OF THE INVENTION

In the public switched telephone network, echo signals arise from impedance mismatches. Despite care in impedance matching, central office hybrids (which convert between 2-wire subscriber lines and the 4-wire circuits used for inter-office transmission) give rise to residual echo even when the end-to-end circuit delay is only moderate. In order to achieve more complete echo suppression, echo cancellers are employed at each end of the 4-wire transmission path between remote hybrids. An echo canceller has one of its legs positioned to receive the signal incoming from the distant end of the 4-wire path and to pass it through unchanged to its adjacent hybrid's receive leg.

To overcome the echo, the echo canceller adaptively adjusts the coefficients of a finite impulse response (FIR) filter to model the echo path so that an estimate of the echo can be subtracted from the signal being returned to the distant end. The echo canceller adapts its filter based upon a comparison of the far end signal and the echo of the far end signal injected into the transmit leg by its adjacent hybrid. The adaptation process is can be a stochastic gradient step method which uses a rough (noisy) estimate of the gradient, $g(n)=e(n) \times (n)$, to make an incremental step toward minimizing the energy of the echo signal in the transmitted signal. This is the classic LMS process.

Once the adaptation process has adjusted the FIR filter's coefficients sufficiently to provide a reasonable approximation of the impulse response of the echo path, the system is said to have "converged." However, when the transmit path contains speech intended to be transmitted to the far end, such speech will tend to interfere with the convergence of the filter adaptation program. Accordingly, the filter should not be adjusted from samples taken when both parties are talking; a condition referred to as "double-talk", since such samples do not accurately represent the echo path and will cause the filter adaptation program to diverge from a correct solution. Prior art patents, such a U.S. Pat. Nos. 5,953,420; 5,606,550; 5,390,250; 5,193,112 and 4,894,820, have recognized the importance of blocking filter adaptation when double talk is detected. However, because it takes a finite time to detect the double talk condition, some near end samples containing near-end speech may have already been used to update the FIR coefficients. Use of such samples will tend to prevent the adaptation program from properly converging. It would be extremely advantageous to rapidly detect the double talk condition and, during the interval that it takes to do so, to furnish the filter adaptation program with appropriate coefficient values for the FIR filter.

Detection of the double-talk condition is further complicated when the echo path has significant delay. Under circumstances of significant delay, the echo of the far signal, as perceived at the near end input to the echo canceller, may arrive after the far signal has disappeared, for example at the end of a syllable. When this happens the echo of the far signal appearing at the near end input, when the far signal has already disappeared from the far end input, will be mistaken as a double-talk condition and halt the adaptation of the FIR filter coefficients.

Besides double-talk, there is another condition that will adversely affect adaptation. The tone signals employed in the PSTN, as well as the tones emitted by modems, have the ability to cause an echo canceller to fail to converge properly. It would be advantageous to detect such tones as well as any stationary signals such as periodic background noise that may be caused by a motor, fan, or engine that present themselves and to prevent the adaptation program from being adversely affected by them.

The typical impulse response of the echo path is of a diffuse nature whose value deteriorates with time over a period termed the echo tail". To make matters more complex, it is possible that multiple echo sources can be present in the network whose echo tails may change with time. A good echo canceller should adapt to an echo path and cancel the echoes from all the echo sources in the network within an appropriate convergence time. This requires that the number of independent echo tails be determined so that the echo path can be properly modeled for each such tail. While at first glance it would see appropriate to sample the echoes to find the largest amplitudes signals, it turns out that the largest amplitude signals that are found may not belong to independent echoes. Accordingly, it would be advantageous to be able to determine which amplitude samples belong to which echoes so that the echo path can be properly modeled.

SUMMARY OF THE INVENTION

In accordance with the principles of the invention, a "fast attack" method rapidly detects the onset of a double talk condition by monitoring the rate of change of near end signal amplitude and by changing the time constant used to compute its average power. Filter coefficients that may have been modified during the time it takes for the fast attack method to change the time constant are discarded, and filter coefficient values that were obtained during a previous, better converged state of the filter are substituted.

Further in accordance with the invention, not only tonal signals, but any signals which have a high degree of autocorrelation are preventing from disrupting convergence of the filter adaptation program by autocorrelating successive far end samples to obtain three autocorrelation coefficients (CORRi for i=0 . . . 2). Then, an LPC analysis is performed on the three autocorrelation coefficients to obtain two reflection coefficients RC0 and RC1 where $RC_0 = -CORR_1/CORR_0$ and $RC_1 = (CORR_2 * CORR_0 - CORR_1^2)/(CORR_0^2 - CORR_1^2)$. A highly correlated signal tends to have a lower value of RC1 while a stationary signal should have little variation in both RC0 and RC1. The mean, MRC, and the approximate variance, VRC, are monitored to detect signals above a preset threshold.

Further in accordance with the invention, the echo tails from multiple time variant echo sources are adaptively suppressed by determining which echo amplitudes correspond to echoes from independent sources. An array CC[0 . . . (T−1)] is formed by cross-correlating the far signal with the normalized near signal. The local maximum amplitudes are found in the CC array for every group of 16 samples in the array. A resulting Peak array (which has ⅟₁₆ the number of samples as the CC array) is formed. The decimated (peak) array is searched under the assumption that the peak amplitude in an independent tail will be found close to the beginning of the tail. Once a peak has been identified in the decimated array, all of the elements associated with that peak are flagged so that they will not again be searched. The result of this procedure is a set of flags that indicate the areas which will be adapted by the FIR filter adaptation program.

Further in accordance with the invention, the amount of delay affects the computation of the step size used in normalization of the LMS adaptation of filter coefficients and for updating cross-correlations. When the echo delay is short, a measure of the most recent value of the inverse of the far end power (IABSY)$^2$ is used. When there is significant delay, the square of the most recent value of IABSY is no longer a fair measure of the far end power that corresponds to the echo caused by a past component of the far end signal. Accordingly, instead of using (IABSY)$^2$ to normalize the step size, the product of the most recent value of IABSY and a previous value of IABSY that corresponds to the echo delay is taken from the history array (IABSYH) and used to form the product IABSY*IABSYH for computing the step size.

BRIEF DESCRIPTION OF THE DRAWING

FIG. 1 shows the positions of the hybrids and echo cancellers in the transmission path between two telephones interconnected through the PSTN;

FIG. 3 shows the association between cross-correlation array and the decimated array, which locates independent echo tails.

DETAILED DESCRIPTION

Figure 2:
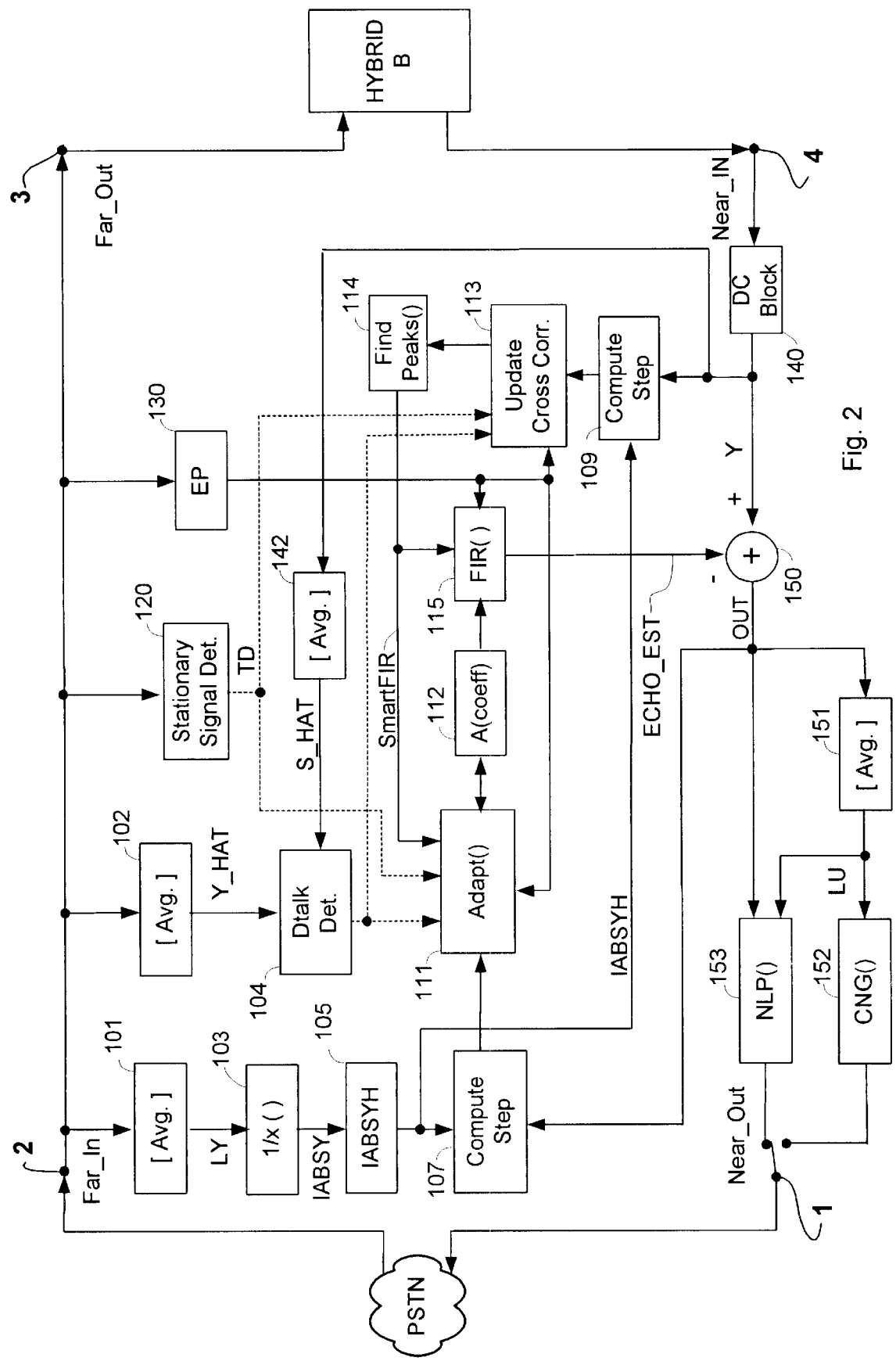
FIG. 2 shows the main processing functions performed in accordance with the invention by the echo cancellers of FIG. 1.

In FIG. 1 an echo canceller is inserted at each end of the transmission path to neutralize the imperfect balance of a respective one of the hybrids. The hybrids and the echo suppressers are 4-terminal devices. Terminals 1 and 2 of each echo canceller face the PSTN while terminals 3 and 4 face the adjacent hybrid. In FIG. 2 the details of the processing performed at one of the echo cancellers are shown with its terminals correspondingly numbered. The speaker at the PSTN side of the link in FIG. 2 is referred to as the far end speaker while the speaker at the hybrid side of the link is referred to as the near end speaker. Terminal 2 is labeled Far_in, corresponding to the input from the far end speaker. In the terminology used by the ITU, this signal is named Rin. Terminal 3 is labeled Far_Out, corresponding to the far end speaker's signal passing through the echo canceller toward the hybrid and thus toward the near end speaker. In the terminology used by the ITU, this signal is named Rout. Terminal 4 is labeled Near_In, corresponding to the input from the near end speaker. In the terminology used by the ITU, this signal is named Sin. Terminal 1 is labeled Near_Out, corresponding to the (echo cancelled) near end speaker's signal passing through the echo canceller toward the PSTN and thus toward the far end speaker.

TABLE I

Perform general initialization

For each sample in the frame do
Shift the Echo Path Array
Perform stationary signal detection
Perform Peak Search
Perform FIR filtering (with or without adaptation)
Perform DC blocking filter on Near_In sample
Remove echo from DC blocked near signal
Perform Nonlinear processing and Comfort Noise Generation
Update Cross-Correlation
Estimate near end power for NLP processing
Estimate far end power for NLP processing
Compute IABSY - far end normalization factor
Update IABSYH (history)
Perform near end speech detection for double-talk detection TABLE I-continued Perform general initialization Perform far end speech for double-talk detection
Increment modulo-16 counter H
Update partial maximum array M
Perform double-talk detection
Decrement double-talk hang counter (no smaller than 0)
Determine if coefficients will update next sample
Save or Restore FIR coefficients and
Smart_FIR data as necessary
Update FIR convergence statistics Returning to FIG. 2, the Far_In signal from the PSTN appears at terminal 2 and is sensed by block 101. Block 101 computes an average of the absolute amplitude LY of the Far_In signal using a first time constant. The average amplitude LY is fed into block 103, which computes its reciprocal so that a normalized amplitude can be calculated. Every 16$^{th}$ value of the reciprocal of the average echo amplitude is stored in history buffer IABSYH 105. Past values of IABSY are stored because it is beneficial to compute the step size based upon the far end power as measured at the time associated with the echo delay of the coefficient being computed. The current far end amplitude statistic by itself is not an appropriate statistic to be used when updating a coefficient associated with the far end signal in the past.

The Far_In signal at terminal 2 is also sensed by block 102, which computes an average value of its absolute amplitude (Y_HAT) using a different time constant than block 101. The average far end signal Y_HAT is fed to double talk detector 104. Block 102 uses a different time constant from block 101 to improve the performance of the double talk detector.

The Far_In signal is also fed to stationary signal detector 120 which detects signals that have a high degree of auto-correlation and which do not change rapidly, e.g., PSTN signaling and modem signaling tones. Detector 120 provides an output TD when stationary signals are detected. The TD output 120 is fed to adapt block 111 as well as to update cross correlation block 113. When a stationary signal is detected, the TD output will prevent updating of information in blocks 111 and 113.

The Far_In signal is also fed into echo path EP array block 130 which retains N past samples of the Far_In signal, where N corresponds to the maximum length echo tail that the echo canceller is configured to cancel. For example, if the maximum tail length is 128 msec, N would be 128E−3*8000 samples/sec=1024 samples. The echo path array EP is shifted as in a tapped delay line. The newest Far_End sample F is entered into the input stage EP$_0$. Shifting a new sample into the echo path array is expressed as:

$$EP_i = EP_{i-1}; i=1 \ldots T$$

$$EP_0 = F$$

The array of past samples from echo path block 130 is fed to FIR filter 115, update cross correlation block 113, and adapt block 111, each of which will be discussed later.

At terminal 4 signals from the adjacent hybrid "B" are applied. These Near_In signals at terminal 4 include any speech signal from the adjacent telephone (not shown, but which is located at the right-hand side of hybrid "B"), as well as an echo component of the Far_In signal, which has leaked through the adjacent hybrid. DC blocking filter 140 attenuates any DC content in the Near_In signal. The DC blocked Near_In signal is fed to both to block 142, which computes its average amplitude, and to block 109. Block 142 applies signal S_Hat representing the average amplitude of the Near In signal to double talk detector 104. Detector 104 inhibits operation of adapt block 111 in the presence of local speech. Detector 104 detects local speech by comparing the average signal amplitudes S_Hat and Y_Hat. When the ratio exceeds a predetermined threshold, the adaptation process is inhibited. In accordance with an aspect of the invention, however, block 142 changes the time constant used to compute the average Near_In signal in the presence of a rapid change in amplitude of the Near_In signal. By responding to a rapid increase in the signal at terminal 4, block 142 performs a fast attack computation which causes a temporary decrease in the time constant of its averaging function to inhibit block 111 faster than in prior art circuits.

Double talk detector 104 compares the ratio of the amplitudes of the Near_In and the Far_In signals. As the near signal level approaches the far signal level, detector 104 decides that a near speaker is talking and temporarily disables the operation of adaptation block 111. To avoid pre-mature termination of the double-talk condition during pauses in normal speech, a hangover timer within block 104 is set to the hangover time interval HT and begins to decrement when the double-talk condition subsides. The adaptation by block 111 and cross-correlation updates by block 113 remains disabled until the hangover timer expires. A hangover time may advantageously be set to a default value of 600 samples or 75 milliseconds.

The DC blocked Near_In signal is also fed into compute step block 109 which uses the DC blocked Near_In signal and the past values of the reciprocal of the Far_In echo amplitude, IABSYH, to compute a step size used in update cross correlation block 113. Update cross correlation block 113 performs a weighted cross-correlation between the DC blocked Near_In signal and the Far_In signal as determined by the weighting factor, IABYSH.

The DC blocked Near_In Signal is also fed to adder 150, which subtracts an estimate of the echo from the DC blocked Near_In signal. The resulting signal is the Echo Cancelled Near_In signal which is fed to compute step block 107, the output of which is used by FIR adaptation block 111.

Adaptation block 111 dynamically updates a model of the echo using the least mean squares (LMS) algorithm. The model is represented as a set of FIR filter coefficients (A_coef) 112, which are continuously updated using the LMS algorithm. FIR filter 115 generates an estimate of the echo signal using the echo path model (A_coef) as the filter coefficients and current and past Far_In (EP 130) input signal as the inputs to the FIR. The output of FIR filter 115 is the estimated echo (ECHO_EST). FIR filter 115 is implemented as a set of filter segments. FIR filter 115, when converged, should have the same impulse response as the echo path. If this is the case, the output of the FIR filter, when stimulated by the Far_In signal, should be the same as the echo caused by the echo path when stimulated by the Far_In signal. By subtracting the output of the FIR filter, the echo is removed.

The echo tail may have zero components over some portion of its duration and it is desirable to avoid operating FIR filter 115 over ranges of echo tail where the FIR filter coefficients are zero. By avoiding these calculations, the computational requirements on the CPU, as well as the error produced in the LMS algorithm are reduced. In order to avoid such operation of the FIR filter it is necessary to find the non-zero segments of the echo tail. This is done by recognizing that the normalized cross-correlation between the Far_In input signal and the (DC blocked) Near End input signal will have a high average amplitude value in non-zero regions of the echo tail.

The output of update cross correlation block 113 is fed to find peaks block 114 which looks for regions of high cross-correlation. These regions are fed back to FIR filter 115 as Smart FIR data, which tells the FIR filter which segments of filtering should be done. The Smart FIR data is also fed to adapt block 111, which uses the Smart FIR data to determine which sections of the A_coef array should be updated using the LMS algorithm.

The cancelled Near End signal is fed to block Avg 151, which computes the average amplitude of the cancelled Near End signal and applies it to non-linear processor 153. Non-linear processor suppresses small residual echo signals. If the ratio between the amplitude of the Far_In signal and that of the cancelled Near End signal exceeds the minimum NLP threshold, it is an indication that the cancelled Near End signal contains only residual echo, which is suppressed by the NLP resulting in silence at the Near End. Alternately, comfort noise generator 152 may be enabled to generate Near End comfort noise at the Near End rather than silence under residual echo conditions.

Tables I Details
Shift the Echo Path Array

The echo path array (EP) is shifted as in a tap-delay-line fashion. The newest far end sample is shifted into the input. (It will be apparent that using a digital signal processor, a more efficient implementation will result from using a circular buffer.)

$$EP_i = EP_{i-1} : i = 1 \ldots T$$

$$EP_0 = F$$

where F is the newest far end sample, and T is the total tail length supported by the echo canceller.

Perform Stationary Signal Detection

Stationary signal detection is done by performing a second order LPC (Linear Predictive Coding) analysis on the far end signal. The mean and variance of the two reflection coefficients are monitored and used to determine if a stationary signal is present. The logic of the detector is to assume that a stationary signal is present, until proven otherwise. We therefore set the tone detect flag (TD) first:

$$TD = 1$$

Next, an autocorrelation is performed on the Far_In signal. The three autocorrelation coefficients are updated on a sample-by-sample basis as new far end samples are processed $$CORR_i = CORR_i + 1/N(EP_0 * EP_i) : i = 0 \ldots 2$$

where N is the number of products that will be accumulated in the autocorrelation process (see next paragraph). The division by N is not necessary in the floating-point case because overflow cannot occur and it is permissible for the correlation values to differ by a multiplicative constant. In the fixed-point case, it is necessary to divide by N to prevent overflow. It is sufficient to shift right by a number that approximates a division by N for efficiency. The autocorrelation result is examined periodically, for example, once per frame. A modulo type counter is used to determine if it is time to post-process the autocorrelation result. If it is time to do so, an energy check is done. If the Far_In signal energy is lower than a threshold value, the detector output flag is set to zero (TD=0). The energy determination is done by comparing the first autocorrelation coefficient to a threshold, which illustratively may be the equivalent of −39 dBm.

ENERGY=MIN(CORR[0], PCORR[0];

if(ENERGY<CORR_THRESH)TD=0;

PCORR[0]=CORR[0];

LPC analysis is performed on the three autocorrelation coefficients, to generate two reflection coefficients RC0 and RC1, where:

$RC_0 = -CORR_1/CORR_0$ $RC_1 = (CORR_2*CORR_0 - CORR_1^2)/CORR_0^2 - CORR_1^2$

RC0 is a statistic in the LPC analysis that should remain relatively unchanged for the duration of a stationary signal. RC1 represents an error term that is an indirect measure of the bandwidth of the signal and which, if the signal is a sinusoid, should be zero. As the bandwidth increases, the error term increases. The detector looks for rapid changes in both reflection coefficients, which indicates that the signal is not stationary.

Following the use of the CORR array, its contents are set to zero to begin the next cycle. Next, the mean (MRC) and "variance" (VRC) of the reflection coefficients are computed. (Note a true variance is not computed. In order to simplify fixed-point implementation, the absolute value is used rather than the squaring operation in the computation of the variance.) The mean and variance are computed using an autoregressive filter.

$MRC_i = 0.5MRC_i + 0.5RC_i$: $i=0 \ldots 1$ $VRC_i = 0.75VRC_i + 0.25(MRC_i - RC_i)$:$i=0 \ldots 1$ In the above expressions, MRC was reduced by half and added to half RC by empirical determinations, as was the weighting of VRC with ¼ of (MRC−RC). At this point, all the necessary statistics have been computed for the final detector decision. The decision is made using the following algorithm:

if (abs (RC[0]−MRC[0])>K1)
   TD=0
if (abs (RC[1]−MRC[1])>K2)
   TD=0
if (VRC[0]>K3)
   TD=0
if (VRC[1]>K4)
   TD=0 where K1 through K4 are empirically derived constants.
Perform Peak Search

A cross-correlation signal (between the far signal and the normalized near signal) is used to find the peaks in the echo tail. A peak search is performed as necessary. Since the cross-correlation array is not always updated, it only makes sense to perform the peak search under conditions when it is being updated. The peak search is therefore performed once after FTCP cross-correlation array updates. For the sake of efficiency, the cross-correlation array (CC) is decimated by a factor of 16 to form a decimated array P16[0 . . . (T/16−1)]), each element of which is computed by finding the maximum absolute value of the associated 16 samples of the CC array:

$P16_i = \max_{k=i*16}^{k=i*16+15} [abs(CC_k)]$

P16 is dimensioned to one sixteenth the size of CC (or one sixteenth of the total number of taps in the FIR) due to the decimation by a factor of 16. The association between the P16 array and CC array is shown pictorially in FIG. 3. Since the echo canceller is capable of handling up to NT independent echo tails, it is necessary to find the NT largest tails. The maximum size of each of the NT tails is defined as TSIZ. At first glance, one might decide to find the NT largest amplitude samples in P16 in order to find the NT tails. This would not work because it is likely that two or more of these largest amplitude samples would fall close enough to each other to be covered by a single tail. An assumption is made that the peak amplitude in an independent tail occurs close to the beginning of the tail. The algorithm for finding the NT largest tails is as follows: First we define an array of flags F16, (see FIG. 3), whose dimension is equal to that of P16. Flag array F16 identifies the regions of the peaks in P16 which have already been determined to be within one of the NT tails. We perform NT peak searches in array P16. Once a peak P has been identified, all the elements in P16 that are associated with that peak are set to zero so they will not be candidates for the subsequent peak search. The following elements are eliminated: P−1, P . . . P+TSIZ/16−2, (unless the elements are out of the boundaries of the P16 array). Stated differently, the Peak Search algorithm is as follows:

Clear all flags in F16 array.
   Repeat NT times
      Find P−Maximum value in P16
      Select elements P−1, P , . . . P+TSIZ/16−2
      Clear selected elements in P16
      Set selected flags in F16 array An example may make the foregoing clearer. Referring to FIG. 3, first decimate the CC array by a ratio of 16:1 and store the peak amplitudes of each 16-sample segment in the elements of the P16 array. Next, search the P16 array for the maximum. Let it be assumed that the maximum is at element 2. As a result, set flags in the F16 array in the vicinity of the second element: set F16[2], as well as one element behind (F16[1]) and two ahead (F16[3] and F16[4]. Next, clear the P16 array at these locations (1 . . . 4) and search again to find the next peak. Repeat this procedure for as many FIR segments as are specified in the echo canceller configuration. If we are to search for a maximum of 3 tails, for example, we do the search of P16 and write new flags to F16 3 times.

The result of this procedure is a set of true flags in the F16 array that are indicative of the most active areas of the echo tail. The F16 array reflects the peaks with respect to CC and A (coefficients) in a decimated fashion. For example, the first element in F16 corresponds to the first 16 coefficients in A. The second element in F16 corresponds to coefficients 16 through 31 in A1, etc.

We introduce the Smart FIR (SFIR) structure. The Smart FIR contains information about the position and length of the NT tails. From an understandability standpoint, the easiest way to define the tails would be using a start index and a length. The SFIR structure is used in both the LMS update and the FIR filtering. For the sake of efficiency in pointer math, we use an offset from the end of the previous segment rather than a start index. We therefore define SFIR as an array of NT structures, each containing an offset and a length:

SFIR[NT]
  OFFSET
  SIZE

With this definition out of the way, we can describe the algorithm that uses the information in F16 to create SFIR.

```
State = 0;
Clear out SFIR[NT];
EndSegPrev = 0;
Seg16 = 0;
for (S = 0; S < NUPS; S++)
{
  switch (State)
  {
    case(0)
    {
      if (F16[Seg16])
      {
        State = 1;
        SFIR[S].LENGTH += N_PHASES;
        SFIR[S].OFFSET = S*16 - EndSeqPrev;
      }
      break;
    }
    case(1):
    {
      if (FI6 [Seg16])
      {
        SFIR[S]. LENGTH += 16;
      }
      else
      {
        Seg16 += 1;
        State = 0;
        EndSegPrev = Seg16*N PHASES;
      }
      break;
    }
  }
}
SFIR is used the by the FIR filtering operation.
```

Perform FIR Filtering

The FIR filtering operation is the core of the echo canceller. The adaptive filter is the model of the echo path for which the echo canceller attempts to correct. It can be viewed as an estimate of the impulse response of the circuitry that induces the echo. Based upon near and far signal characteristics and other constraints, adaptation of the echo canceller FIR coefficients may be enabled or disabled. This decision is made based upon the state of the Update flag (UPDF). If UPDF is set, adaptation occurs. Otherwise it does not. In order to exploit the architecture of a particular DSP, such as the TM5320C5000, two different sections of code are used to implement the FIR, depending upon whether or not adaptation is taking place. Both of these operations are described in the two sections that follow.

FIR Filtering without Adaptation

In the case of FIR filtering without adaptation, the operation is a sequence of up to NT FIR filters based upon the information contained in SFIR. We define a few local variables:

```
Sum: FIR filter running sum
C_p: Pointer within FIR coefficient array (A)
E_p: Pointer within echo path array (EP)
Sum=0;
```

-continued

```
C_p= &A [0];
E_p = &EP [0];
for (k = 0; k < NT; k++)
{
    E_p += SFIR[k].OFFSET;
    C_p += SFIR[k].OFFSET;
    for (i = 0; 1 < SFIR[k].LENGTH; i++)
    {
        Sum += *E p * *EC_p;
        E_p += 1;
        C_p += 1;
    }
}
```

The output of the FIR filter, Sum, is the estimate of the echo. This estimate is later subtracted from the near end signal.

FIR Filtering with Adaptation

In the case of FIR filtering with adaptation, the operation is a sequence of up to NT FIR and LMS operations based upon the information contained in SFIR. The following are defined as local variables:

```
Sum: FIR filter running sum
C_p: Pointer within FIR coefficient array (A)
E_p: Pointer within echo path array (EP)
Step: The adaptation step size
FIRIndex: Index of the start location of an FIR Segment
acc0: temporary variable
LAMBDA: Constant 1/341
Sum=0;
FIRIndex = 0;
C_p = &A[0];
E_p = &EP[0];
for (k = 0; k < NT; k++)
{
        FIRIndex += SFIR[k].OFFSET;
        Step = LAMBDA * OUT * IABSY *
        IABSYH[(FIRIndex >> 4) && 0x38];
        E_p += SFIR[k].OFFSET+SFIR[k].LENGTH;
        C_p += SFIR[k].OFFSET+SFIR[k].LENGTH-1;
        acc0 = (long) *E_p * (long) Step;
        E_p -= 1;
        for (i = 1; i < SFIR[k].LENGTH; i++)
        {
            Sum += *E_p * *C_p;
            *C_p += acc0;
            C_p -= 1;
            acc0 = *E_p * Step;
            E_p -= 1;
        }
    *Sum += *E_p * *C_p;
    *C_p += acc0;
    E_p += SFIR[k].LENGTH;
    C_p += SFIR[k].LENGTH;
}
```

The output of the FIR filter, Sum, is the estimate of the echo. This estimate is later subtracted from the near end signal. There are two key operations occurring in the inner loop. One is the FIR operation (Sum +=). This is straightforward. The second operation is the coefficient update. Each new coefficient is being updated by an increment that is computed based upon the step size and a past far end sample stored in the echo path and pointed to by E_p.

One additional clarification needs to be made regarding the following instruction:

Step=LAMBDA * OUT * IABSY *
    IABSYH [(FIRIndex>>4)&& 0x38];

The step size in the classical LMS algorithm is scaled by the reciprocal of the far end power. IABSY represents the reciprocal of the Far_In amplitude at the current point in time. IABSYH contains the past values of IABSY, decimated by a factor of 16. The particular value of IABSYH that is used in the inventive embodiment corresponds to the delay associated with the first coefficient in the FIR segment being updated (FIRIndex). The shift right of 4 takes care of the decimation by 16. The AND operation with 0x38 was empirically derived.

Perform DC Blocking filter on Near Input Sample

A DC blocking filter is applied to the near signal in order to prevent a DC bias from accumulating in the FIR coefficients (A). The DC bias filter is performed as follows:

$$Y = \frac{7}{8}Y + \frac{15}{16}[X - XOLD]$$
$$XOLD = X$$

Remove Echo from DC Blocked Near Signal

An echo estimate was computed by the FIR filtering operation described earlier. This echo estimate is subtracted from the near end sample in order to remove the unwanted echo, forming the output sample (OUT).

$$OUT=Y-ECHO\_EST$$

Where ECHO_EST is the output of the FIR filtering (Sum).

Perform Nonlinear Processing and Comfort Noise Generation

The LMS adaptation technique does not model the echo path exactly. As a result, a small amount of unwanted residual echo still remains in the near end signal after removing the echo estimate. In order to remove this residual echo, a non-linear processor (NLP) is used. If the power ratio of the Far_In signal to the echo-cancelled near end signal exceeds the NLP threshold, the near end signal is set to zero. If there is background noise at the near end, the operation of the nonlinear processor can become an annoying artifact to the far end listener because the NLP will periodically squelch the background noise, causing a pulsing effect between background noise and silence. This effect is circumvented by using a Comfort Noise Generator (CNG). When the CNG is enabled, instead of replacing the near end signal with silence as does the NLP, the near end signal is replaced by a scaled noise signal. The CNG output is only used under the same conditions that the NLP activates; when the power ratio of the near end signal to the Far_In signal exceeds the NLP threshold. The CNG output (CNGO) sample is computed by scaling a random (or other type of) noise signal (RND). The scale factor is a combination of a fixed fraction (F) and the amplitude of the echo-cancelled near signal (ABSU). This ensures that the level of the comfort noise approximates the level of the background noise.

$$CNGO=RND*F*ABSU$$

Update Cross-Correlation

The cross-correlation update is an LMS-like operation that uses the Echo Path (containing the past far samples) as one input and a Step Size as the other input. The operation is similar (but not identical) to the LMS update of the FIR coefficients. The step size is computed using the variables:

Y—Current near sample after DC blocking
IABSY—Reciprocal of far end power
IABSYH—Past values of IABSY As with the FIR coefficient update, the past values of IABSY are necessary because we are updating cross-correlation samples based upon statistics that are so far in the past that IABSY is no longer a valid approximation. As a result, the cross-correlation is split up into NTUB (Number of Tap Update Blocks) sections, each of length TUBS (Tap Update Block Size). Each section uses a different value in the IABSYH array in computing the step size. The algorithm is described as follows:

Define:

```
C_p: Pointer within cross-correlation array (CC)
E_p: Pointer within echo path array (EP)
Step: The cross-correlation step size
FIRIndex: Index of the start location of an FIR Segment
acc0: temporary variable
LAMBDA: Constant 1/341
Sum=0;
FIRIndex = 0;
C_p = &CC[0];
E_p = &EP[0];
for (k = 0; k < NTUB; k++)
    {FIRIndex += SFIR[k].OFFSET;
    Step = LAMBDA * Y * IABSY *
    IABSYH[(FIRIndex >> 4) && 0x38];
    for (i = 1; i < TUBS; i++)
    {
        *C_p = 63/64* (*C_p) + (*E_p) * Step;
        C_p += 1;
        E_p += 1;
    }
}
```

IABSY represents the reciprocal of the Far_In amplitude at the current point in time. IABSYH contains the past values of IABSY, decimated by a factor of 16. The particular value of IABSYH that is used corresponds to the delay associated with the first coefficient in the FIR segment being updated (FIRIndex). The shift right of 4 takes care of the decimation by 16. The AND operation with 0x38 was empirically derived.

Estimate Near and Far End Power for NLP processing

As mentioned earlier, both the near and far end power estimates are needed to decide whether or not the NLP should activate. Both estimates are actually computed as average amplitudes rather than average power. The near end power (LU) is updated based upon the absolute value of the residual near end signal (OUT):

$$LU=(1-A)*LU+A*abs(OUT)$$

where A is 1/256. The far end power (LY) is also computed as the average amplitude of the Far_In signal (F). Please note that although the section heading refers only to the NLP, LY is also used in computing the step size for adaptation and updating the cross-correlation array. A fast attack feature has been incorporated into this far end power measurement. This feature is for the benefit of the adaptation. At the onset of far end speech, it is possible that the FIR coefficients will diverge slightly because the far end power has not had a chance to ramp up yet. This affects the step size adversely. It is therefore desirable for the power to be able to ramp up faster than it can ramp down. If the amplitude of the current Far_In sample significantly exceeds the average amplitude, the average amplitude is increased at a faster than normal rate. The algorithm follows:

```
if(abs(F)>16*LY)
    LY=(1-A)*LY+A*abs(F)
else
    LY=abs(F)/4
```

Compute IABSY—Far in Normalization Factor

IABSY, the far end normalization factor is the inverse of the far end power. IABSY is used for step size computation during adaptation as well as during cross-correlation computation. Computation of IABSY is a simple division.

$$IABSY = 1/LY$$

Update IABSYH (History)

Array IABSYH is used to store past values of IABSY, the far end normalization factor. It is not necessary to store every value in the IABSYH array. We therefore only store every 16th value. This is accomplished by checking H, a modulo 16 counter. If H is equal to zero, a new value of IABSY is shifted into IABSYH in a delay line fashion.

```
if (H == 0)
{
    for (i = NUPS - 1; i > 0; i--)
        IABSYH[i] = IABSYH[i-1];
    IABSYH[0] = IABSY;
}
```

Compute Near and Far End Speech Power for Double-Talk Detection

Although the near and far end speech power have already been computed for the purpose of the NLP, they must be computed again for the purpose of double-talk detection. This is true for a few reasons.

1. The filter time constants are different.
2. The near power computation employs the fast attack technique rather than the far power. This enables the double-talk detector to detect more rapidly at the onset of near end speech. This is especially important if the Coefficient Save/Restore feature is not being used.
3. The double-talk threshold is built into the computation of the near end power.

(This is an implementation detail that does not affect algorithm.)

The near end power (SH) is computed from the current near end sample (N) as follows: ABSS=abs(N);

if ((ABSS*DTSCALE)/16>SH)
        SH=ABSS*DTSCALE;
    else
        SH=(1-A)*SH+A*ABSS*DTSCALE;
where:
    A=1/64

DTSCALE is a scale factor that depends upon the double-talk threshold setting 0 dB=1.0
    3 dB=0.71
    6 dB=2.0
    9 dB=2.81

The far end power (YH) is computed from the current far end sample (F) as follows:

$$YH = (1-A)*YH + A*abs(F)$$

Increment modulo-16 Counter H

H is a modulo 16 counter that controls how often certain events occur. It is updated once per sample as follows:

$$H = (H+1) \& 0xf$$

Update Partial Maximum Array M and Perform Double-talk Detection

The partial maximum array (M) is used to keep track of the far end power and the past far end power looking back as many samples as are covered by FIR filter coefficients. This must be done for the benefit of the double-talk detector. If the echo path has significant delay, the echo of the far signal, as perceived at the near end input to the echo canceller, will arrive after the far signal has disappeared as will occur at the end of a syllable. If we allowed the double talk detector to use the current far end power to compare with this near end signal for the purpose of double-talk detection, we would be fooled quite often into thinking that delayed echo was actually double-talk. In order to prevent this, we keep track of the partial maximum (MAXM) of the far end power over the duration of the possible echo tail. We use this statistic as input to the double-talk detector. By partial maximum, we mean that we do not save the all T samples in the M array. Instead, we save T/16 and only shift the newest sample into the delay-line once every 16 samples.

The following is performed only once for every 16 samples:

if (MAXM==M[NUPS])
        MaxM=max(M[j]; (j=1 . . . NUPS-1)
    if (abs(YH)>MAXM)
        MAXM=YH;
    for (j=NUPS;j>0; j--)
        MD[j]=M[j-1];
    M[0]=abs(YH);

The following is performed during the processing of remaining 15 out of 16 samples:

if (abs(YH)>M[0])
        M[0]=abs(YH);
    if (M[0]>MAXM)
        MAXM=M[0];

The resulting value of MAXM is used to compare with the near end power SH to determine if double-talk is present. If double-talk is detected, the hang counter (HC) is initialized to the hang time (HT). The description follows:

if (SH>MaxM)
        HC=HT;

Decrement Double-Talk Hang Counter

Due to the nature of speech, it is desirable to extend the duration of the double-talk detect period in case the condition recurs shortly. The amount of time that we extend the double-talk detect period is referred to as the hang time (HT). The hang counter (HC) is initialized to the hang time for each sample during which double-talk still exists. Once the double-talk condition goes away, the hang counter begins to decrement without being reinitialized to the hang time. When the hang counter reaches zero, the echo canceller no longer acts as if the double-talk condition exists. The hang counter is not allowed to decrement below zero.

Determine if Coefficients will Update Next Sample

Under certain circumstances, it is possible that the LMS filter adaptation will result in divergence rather than convergence. The same is true of the cross-correlation update. It is important to disable these operations under such circumstances. These circumstances include:

1. Double-Talk
2. Presence of narrowband signals (usually tonal signals)
3. Low far end signal level At the end of the processing of each sample, all these conditions are checked. If any condition is true, filter adaptation and cross-correlation updates are disabled during the processing of the subsequent sample. This is accomplished by clearing the UPD flag. If none of these conditions exist, the UPD flag is set.

Save or Restore FIR Coefficients and Smart FIR Data as Necessary

The condition under which filter can diverge most rapidly is at the onset of double-talk. The LMS algorithm works best when the Near Input signal contains only echo of the far end signal. If a near end talker is speaking, the resulting signal appears as interference to the LMS algorithm. Unfortunately, double-talk cannot be detected instantaneously (within one sample) without making the double-talk detector trivial, but useless. As a result, a few samples could elapse before the echo canceller realizes that double-talk is occurring. Hence, the filter coefficients diverge slightly. A slight divergence can result in many dB of performance loss. To circumvent this problem, we maintain past states of the FIR, with the assumption that the past state is better converged because it has not yet been corrupted by the newest double-talk spurt. By "state", we mean the NT filter coefficient segments and their associated offsets and lengths. This should not be confused with the echo path array (EP), which could also be named the FIR state array in conventional filtering terminology. This filter state information (DTS) contains the saved filter state from the two previous frames (2 instances). DTS breaks down as follows:

DTS
    Instance[2]
        FIRCoef[] (allocation for maximum possible coefficients in NT filter segments)
        Offset [NT]
        Length [NT]
        RestoreFlag—Used to indicate that the coefficients have been restored since the last occurrence of double-talk When a double-talk condition occurs, we actually restore the filter to the state it was in two frames ago. We do this because it is possible that the state from the previous frame was corrupted by a few samples of double-talk, but the double-talk condition was not detected until the current frame. The following pseudo-code describes how the decision to save or restore coefficients is made:

```
if double-talk condition does not exist
    if adaptation has occurred this frame
        Save filter state
        RestoreFlag=0
    else
        if RestoreFlag==0
            Restore filter state
            RestoreFlag=1
```

Update FIR Convergence Statistics

The host system might have reason to know how well the echo canceller is converged. Reasons include multi-channel optimization and performance monitoring. Multi-channel optimization is described in a later section. The echo canceller has the capability to monitor how well it is converged by comparing the current FIR coefficients (A) with those of a previous frame (PA), thereby determining if significant adaptation has taken place. If the change is small, the canceller is assumed to be better converged. The computation of the convergence statistic (CS) must be computed in such a way that it takes the following into account the number of updates (AdaptCount) that have occurred in the current frame. If this is not taken into account during the condition of double-talk, for example, the perceived change will be zero for no other reason than the fact that the coefficient updates were disabled for the duration of the frame.

The convergence statistic is updated as follows:

```
Error = 0
for (j = 0; j < T; j++)
{
    Error += sqr(PA[j] - A[j]);
    PA[j] = A[j];
}
if (AdaptCount != 0)
{
    Error /= AdaptCount;
    CS = 15/16 * CS + 1/16 * Error;
}
```

Multi-Channel Optimization

The CPU load required by the echo canceller varies by a large amount based upon the input near and far signals. The echo canceller operations that contribute the most variation in CPU load are: (a) FIR coefficient adaptation; (b) Cross-correlation computation; and (c) Cross-correlation peak search. These functions all require a significant amount of CPU power, but they are not always executed. For example, when the far end signal is low, adaptation and cross-correlation computation is inhibited. When cross-correlation computation is inhibited, there is no need to perform the peak search because the peaks are not changing. Furthermore, there are situations in which these functions are being executed, but don't need to be executed. In a typical telephone circuit, the echo path does not vary significantly. This is because the echo path is determined by circuitry that does not exhibit much variation. The majority of the FIR coefficient adaptation is performed at the beginning of a call. After that, the coefficients tend to vary slightly around the optimum values. When designing a multi-channel system on a single DSP core, it is necessary to allocate CPU power based upon the peak load across all the channels because we cannot prevent the per-channel peaks from occurring all on the same frame. We can, however, intelligently limit the CPU load on channels that do not require adaptation while allowing other channels to run full steam. A good analogy would be the rolling brownout that power companies use to reduce the peak power production. In order to allow a host system to implement a rolling CPU brownout, we have placed some special hooks into the echo canceller. There are two types of hooks—status hooks and control hooks. These status hooks allow the host software to determine the following:

a. An indication of how much CPU load the each channel is using. A set of Report variables is provided, and b. An indication of how much CPU load each channel needs. The Convergence Statistic (CS) is maintained for this purpose.

The report variables report the number of times a given function has executed during the frame that has just been processed. The report variables include:

a. AdaptReport—The number of samples during which FIR coefficient updates occurred;

b. CrossCorr Report—The number of samples during which the cross-correlation array was updated; and c. Peak Search Report—The number of times the cross-correlation array was searched for peaks.

Quite often, the host will look at the Report variables and determine that no brownout is necessary. When a brownout is necessary, the host can compare the convergence statistic among the various channels to decide which channels are most in need of CPU power. The host can also keep track of which channels were browned out recently to help make the decision of which channels to brown out. The control hooks allow the host software to selectively brown out channels that are not in need of as much CPU power. A set of Limit controls is provided. These limit variables set a limit on how many times a certain function is allowed to execute in a given frame. There are three Limit controls that correspond to the Report variables:

a. Adapt Limit—to limit the number of samples during which FIR coefficient adaptation can take place in the next frame;

b. Cross-Corr Limit—to limit the number of samples during which the cross-correlation array can be updated in the next frame; and c. Peak Search Limit—to limit the number of time the cross-correlation array can be searched for peaks in the next frame.

It is up to the host software designer to use these hooks intelligently.

What has been discussed is deemed to be illustrative of the principles of the invention. Further and other modifications may be made by those skilled in the art without, however, departing from the spirit and scope of the invention.

What is claimed is:

1. A method of echo cancellation for a signal transmission system in which filter coefficients are adapted by cross-correlation of a transmission signal and an error signal, the improvement comprising the steps of:

determining the echo delay;

adjusting the step size used to update adaptation of said filter coefficients and said cross-correlation in accordance with the echo delay; and when there is significant delay, using the product of the most recent value of the far end power and a previous value of far end power that corresponds to the echo delay to normalize said step size.

2. A method according to claim 1 wherein a history buffer stores far end powers end wherein said previous value is taken from said history buffer.

3. A method according to claim 1, wherein the onset of a double talk condition is detected by the steps of:

monitoring the rate of change of near end signal amplitude to detect a rapid increase in near end signal Dower;

changing the time constant used to compute the average power of said near end signal amplitude when said rapid increase is detected; and discarding any filter coefficients that have been modified during the time taken to change said time constant to speed-up the detection of the onset of the double-talk condition.

4. A method according to claim 3 wherein said discarded filter coefficients are replaced by coefficients that were obtained during a previous, better converged state of said filter.

5. A method according to claim 3 wherein echo tails from multiple, time variant echo sources are identified by determining which echo amplitudes correspond to echoes from independent sources.

6. A method according to claim 1, wherein a single CPU performs said adaptation of said filter coefficients and said cross-correlations for a plurality of channels subject to echoes, the improvement comprising the steps of:

a. determining how much CPU load is caused by each channel;

b. maintaining convergence statistics to determine how much CPU load each channel needs in order to continue said updating to maintain convergence; and c. selectively restricting the frequency of said updating of said filter coefficients for certain of said channels when a degree of convergence has been obtained.

7. A method according to claim 6 further including selectively restricting the frequency of peak search in accordance with said convergence statistics.

8. A method of echo cancellation for a signal transmission system in which filter coefficients are adapted by cross-correlation of a transmission signal and an error signal, the improvement comprising the steps of;

determining the echo delay;

adjusting the step size used to update adaptation of said filter coefficients and said cross-correlation in accordance with the echo delay; and identifying echo tails from multiple, time variant echo sources by determining which echo amplitudes correspond to echoes from independent sources by:

a. cross-correlating the far signal and the normalized near signal to form a cross-correlation array CC[O . . . (T-1)];

b. searching said cross-correlation array to find a local maximum for every n samples to form a decimated peak echo array having 1/n the number of samples as the cross-correlation array; and c. flagging all of the elements associated with said maximum local amplitude to exclude them from being selected for filter adaptation.

9. A method according to claim 8 wherein said flagging of said elements associated with said local maximum amplitude excludes said elements from being searched for subsequent peaks.

10. A method according to claim 8 wherein:

the decimated array is cleared of elements identified by said flagging;

said cleared decimated array is again searched to find the next peak;

elements associated with said next peak are flagged for inclusion from filter adaptation; and the preceding three steps are repeated for each of the remaining samples in said cleared decimated array.

11. A method of operating an echo canceller to avoid stationary signals, comprising:

a. autocorrelating successive far end samples to obtain three autocorrelation coefficients (CORRI for I=0, 2);

b. performing a second order linear predictive coding analysis on the three autocorrelation coefficients to obtain two reflection coefficients ($RC_0$ and $RC_1$), (where $RC_0 = -CORR_1/CORR_0$ and $RC_1 = (CORR_2*CORR_0 - CORR_1^2)/(CORRR0^2 - CORR1^2)$);

d. determining that a stationary signal is present when the mean and variance of said reflection coefficients reach preset values; and e. modifying the processing of said samples when said stationary signals are determined to be present.

* * * * *